July 3, 1956 C. B. McKNIGHT 2,753,294
TREATMENT OF OIL BEFORE EXTRACTION WITH SULFUR DIOXIDE
Filed Nov 3, 1952
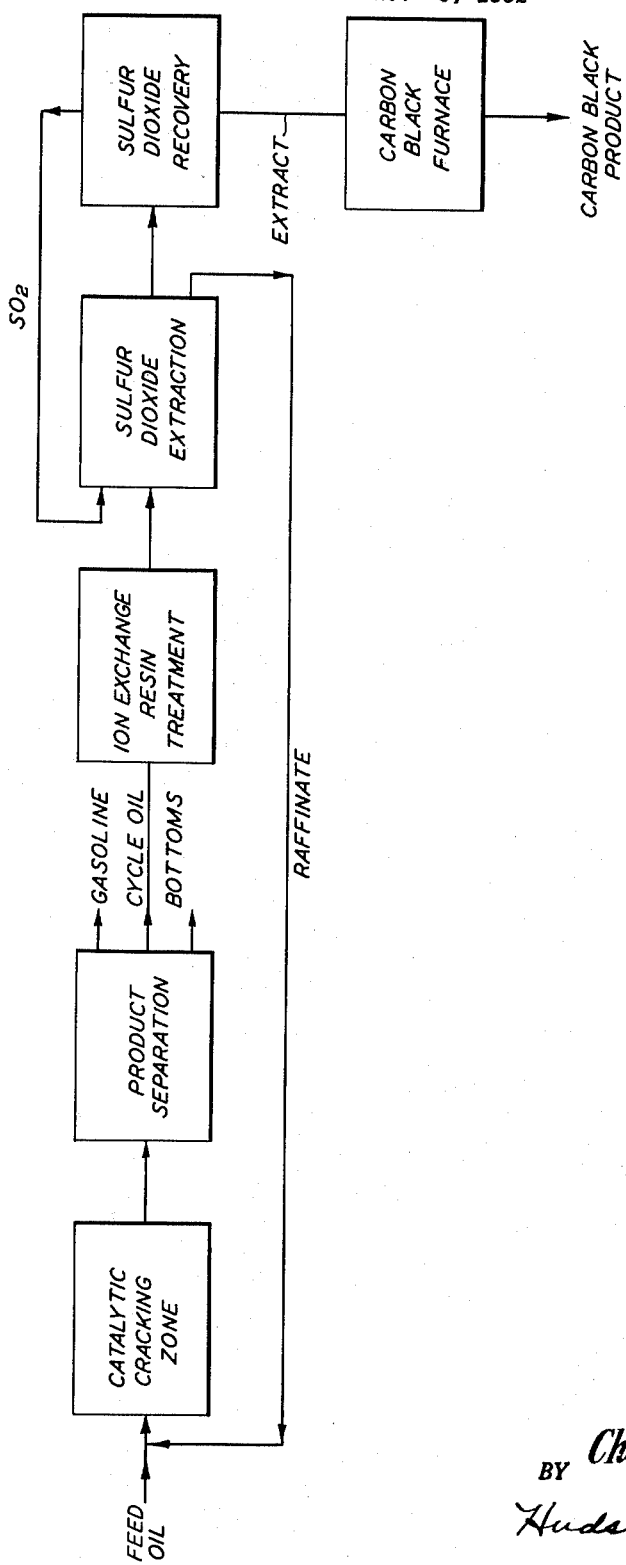
INVENTOR.
Charles B. M<sup>c</sup>Knight
BY
Hudson + Young
ATTORNEYS

United States Patent Office 2,753,294
Patented July 3, 1956

2,753,294

TREATMENT OF OIL BEFORE EXTRACTION WITH SULFUR DIOXIDE

Charles B. McKnight, Bartlesville, Okla., assignor to Phillips Petroleum Company, a corporation of Delaware Application November 3, 1952, Serial No. 318,457

5 Claims. (Cl. 196—52)

This invention relates to a process for reducing the fouling of equipment which is used in the recovery of a certain fraction or fractions from a hydrocarbon mixture employing liquid sulfur dioxide.

The extraction of hydrocarbons employing liquid sulfur dioxide is well-known in the art.

The liquid sulfur dioxide extraction of hydrocarbon fractions has been applied with considerable value in refinery operations. This process has been used on many refinery streams from kerosene to gas oil from both thermal and catalytic cracking and on other aromatic or unsaturate-containing streams. The invention will be set forth and described in connection with the application of its modus operandi in respect of such oils.

The product from a catalytic cracking unit is usually separated by distillation into various fractions including a catalytic gas oil fraction boiling between about 350–410° F. and 750° F. (ASTM distillation). This gas oil fraction is often subjected to a solvent extraction treatment with liquid sulfur dioxide, furfural, or other solvents to recover a fraction rich in unsaturated and aromatic components. This aromatic-rich fraction, the extract from a sulfur dioxide extraction unit, is very desirable as a feed stock in the production of furnace blacks, and the paraffinic fraction, the raffinate from the sulfur dioxide extraction, is used both as an improved cracking stock and as a distillate fuel.

In the liquid sulfur dioxide extraction of the gas oil, or as it is sometimes called, cycle oil, a problem arises in the sulfur dioxide recovery system due to the formation of a solid or resinous material by reaction of the solvent with certain constituents of the oil. The accumulation of this solid material, particularly in the heaters and reboilers and other equipment which is heated to separate the solvent from the extract and raffinate, causes the extraction unit to foul very rapidly and requires that the extraction unit be shut down to remove the deposits.

I have now found that the fouling difficulties occurring in liquid sulfur dioxide extraction units recovering an aromatic fraction from cycle oil of a catalytic cracking unit can be substantially reduced by contacting the cycle oil before the extraction step with an ion exchange resin, such as Amberlite IR-120, a nuclear sulfonic acid-type cation exchange resin. The temperature employed in my process is usually in the range of 100–400° F. and preferably in the range of 125–200° F.; the upper temperature limit depending on the particular ion exchange resin used. Normally, atmospheric pressure is used; however, superatmospheric pressures may be necessary to maintain sufficiently a liquid phase operation with some cycle oils. The space velocity can vary from 0.5 to 10.0 and preferably from 1.0 to 4.0 volumes of oil per volume of resin per hour.

The ion exchange resin used in the practice of the examples of my invention set forth herein, as stated, is a nuclear sulfonic acid-type cation exchange resin presently manufactured by and available from Rohm and Haas and is identified as Amberlite IR-120. Other ion exchange resins of this type, such as Dowex 50 and Nalcite HCR, presently manufactured by and available from Dow Chemical Company, may also be used. The ion exchange resins may be regenerated in the conventional manner with sulfuric acid after first washing the deactivated resin with a solvent such as heptane.

Therefore, according to the invention, there has been provided a process for the extraction of gas oils, and like oils, with liquid sulfur dioxide to recover unsaturated components, including aromatics, therefrom, which comprises first contacting said oil with a nuclear sulfonic acid-type cation exchange resin and then contacting said thus treated oil with liquid sulfur dioxide.

Example

Catalytic gas oil was passed at a space velocity of 1.5–1 over a volume of Amberlite IR-120 maintained at 150° F. and atmospheric pressure. After 16 volumes of cycle oil had passed through the ion exchange bed a volume of 100 ml. of treated cycle oil was recovered and contacted with liquid sulfur dioxide. The quantity of resin formed from the cycle oil contacted with sulfur dioxide amounted to 1.5 mg. per 100 ml. of cycle oil, whereas 10 mg. per 100 ml. of oil were formed when untreated cycle oil was contacted with sulfur dioxide. In another run at 180° F., atmospheric pressure, and 1.5–1 space velocity, the 100 ml. sample collected after 40 volumes of cycle oil has passed over the ion exchange resin contained 4.5 mg. of resinous material per 100 ml. of cycle oil. The ion exchange resin was regenerated by first washing with heptane and then contacting with sulfuric acid.

Advantageously, according to the invention, the cycle oil to be treated with the ion exchange resin, after heat exchange with incoming feed to the catalytic cracking step or with another equivalent stream, is treated under the conditions of the invention, then passed to a sulfur dioxide extraction unit following recovery from which, after separation of the sulfur dioxide extract therefrom, the remaining cycle oil, which can be said other stream, is returned to the cracking operation for further cracking. In one embodiment of this invention the extract phase is treated to recover sulfur dioxide therefrom following which the extract oil is used as a feed for a furnace carbon black producing operation under carbon black producing conditions. Patents Nos. Re. 22,886, June 3, 1947; 2,375,795, May 15, 1945; 2,420,999, May 27, 1947; and others describe preparations of carbon blacks. The use of the resulting extract of this invention as a feed stock for carbon black furnaces appears to reduce mechanical troubles in pumps and lines due to formation of sludge, "slagging" of the carbon black furnace refractory, and the like.

Furthermore, according to this invention, it is clear that the equipment-fouling tendency of the extraction process and of the extract and raffinates produced will have been substantially eliminated and that, therefore, the exchange resin step of the invention has resulted in an improved catalytic cracking operation from which there can be recovered a carbon black furnace feed and in which recycling of the extracted oil will not cause a fouling problem.

In the drawing there is shown schematically a flow plan of an embodiment according to the invention in which a cycle oil obtained from the catalytic cracking of a hydrocarbon oil is treated with an ion exchange resin prior to its contact with liquid sulfur dioxide. After the contact with the ion exchange resin, the further passage of the oil, through the equipment in which sulfur dioxide is present and the equipment following sulfur dioxide removal, can be accomplished without fouling caused by the deposits to which reference has been made herein.

It will be evident to those skilled in the art that the schematic drawing is presented for purposes of simplification and that equipment component parts are not intended to be shown. Thus, in actual plant practice, tanks, pipes, valves, pumps, condensers, heaters, coolers, and other parts must be employed and can be supplied by the routineer. It is the fouling of such parts which this invention is design to prevent. Likewise, in respect of the carbon black furnace, there are required component parts, and again the fouling in this portion of the illustrated embodiment is prevented by application of the present invention.

Reasonable variation and modification are possible within the scope of the foregoing disclosure and the appended claims to the invention, the essence of which is that I have conceived that if an oil to be extracted with liquid sulfur dioxide is first contacted with a nuclear sulfonic acid-type cation exchange resin then, upon contacting with the liquid sulfur dioxide, it will form considerably less, if any resinous deposit and that the extract thus obtained is an improved furnace carbon black operation feed oil substantially as set forth and described herein.

I claim:

1. In the treatment of a gas oil, derived from a cracking of an oil to produce a cracked stream containing unsaturated and aromatic components, in which the said gas oil is extracted with sulfur dioxide and the sulfur dioxide recovered from a phase thus obtained and in which during the recovery of said sulfur dioxide from said phase there are formed fouling deposits in the sulfur dioxide recovery unit, the steps which comprise treating said gas oil with an acid-type cation exchange resin and then contacting said oil under extraction conditions with sulfur dioxide so as to extract therefrom fractions preferentially soluble in sulfur dioxide, separately recovering an extract and a raffinate phase, thus obtaining extract and raffinate phases from which the solvent can be recovered by heating substantially without formation of fouling deposits in the recovery unit.

2. The treatment of a catalytic gas oil fraction boiling in the range of from about 350–410° F. initial boiling point to about 750° F. end boiling point, before said extraction with liquid sulfur dioxide by contacting it with a nuclear sulfonic acid-type cation exchange resin at a temperature in the range of from about 100 to about 400° F. at a pressure sufficient to maintain substantially a liquid phase operation and at a space velocity of from about 0.5 to about 10 volumes of oil per volume of resin per hour, then contacting said oil under extraction conditions with sulfur dioxide so as to extract therefrom fractions preferentially soluble in sulfur dioxide, separately recovering an extract and a raffinate phase, thus obtaining extract and raffinate phases from which the solvent can be recovered by heating substantially without formation of fouling deposits in the recovery unit in which the solvent is recovered from said phases.

3. The process of recovering an unsaturated and aromatics-rich fraction from a gas oil fraction boiling in the approximate range of from about 350 to about 750° F. which comprises contacting said gas oil fraction with a nuclear sulfonic acid-type cation exchange resin at a temperature in the range of from about 125 to about 200° F., at a pressure sufficient to maintain a substantially liquid phase operation, and at a space velocity of from about 1.0 to about 4.0 volumes of oil per volume of resin per hour and then contacting the thus treated oil with liquid sulfur dioxide under extraction conditions thus obtaining an extract phase from which the sulfur dioxide can be recovered by heating substantially without deposition of fouling materials upon the surfaces of the unit in which the recovery of sulfur dioxide from said extract phase is effected.

4. In a catalytic cracking operation in which a hydrocarbon oil is subjected to cracking in the presence of a catalyst and under catalytic cracking conditions the steps which comprise cracking said oil; separating from the cracked oil material thus obtained a cycle oil; adjusting the temperature of said cycle oil to a temperature in the range of from about 100 to about 400° F.; contacting said cycle oil with a nuclear sulfonic acid-type cation exchange resin at a temperature in said range and under a pressure sufficient to maintain substantially a liquid phase operation; separating said oil from said exchange resin; extracting said oil with sulfur dioxide in liquid phase; separating from said oil a sulfur dioxide extract phase; and returning said cycle oil to the cracking operation thus obtaining an extract phase from which the solvent can be recovered by heating substantially without formation of fouling deposits in the recovery unit.

5. A process according to claim 4 in which the extract oil components are separated from the sulfur dioxide and then fed to a furnace carbon black operation in which carbon black is produced by partial combustion of the oil under carbon black producing conditions.

References Cited in the file of this patent

UNITED STATES PATENTS

| | | |
|---|---|---|
| 2,379,966 | Johnson | July 10, 1945 |
| 2,566,353 | Mills | Sept. 4, 1951 |
| 2,608,470 | Helmers et al. | Aug. 26, 1952 |
| 2,609,931 | Rodman et al. | Sept. 9, 1952 |
| 2,613,813 | Rodman et al. | Oct. 14, 1952 |